Jan. 5, 1965 F. B. UPHOFF 3,164,823
SYMBOL GENERATING SYSTEM FOR CRT DISPLAYS
EMPLOYING RETRACE INSERTION
Filed June 29, 1961 3 Sheets-Sheet 1

INVENTOR.
FRANK B. UPHOFF
BY
ATTORNEY

INVENTOR.
FRANK B. UPHOFF
BY
ATTORNEY

INVENTOR.
FRANK B. UPHOFF
BY [signature]
ATTORNEY 3,164,823

SYMBOL GENERATING SYSTEM FOR CRT DISPLAYS EMPLOYING RETRACE INSERTION

Frank B. Uphoff, Churchville, Pa., assignor to the United States of America as represented by the Secretary of the Navy Filed June 29, 1961, Ser. No. 120,804
8 Claims. (Cl. 340—324)
(Granted under Title 35, U.S. Code (1952), sec. 266)

Figure 1:
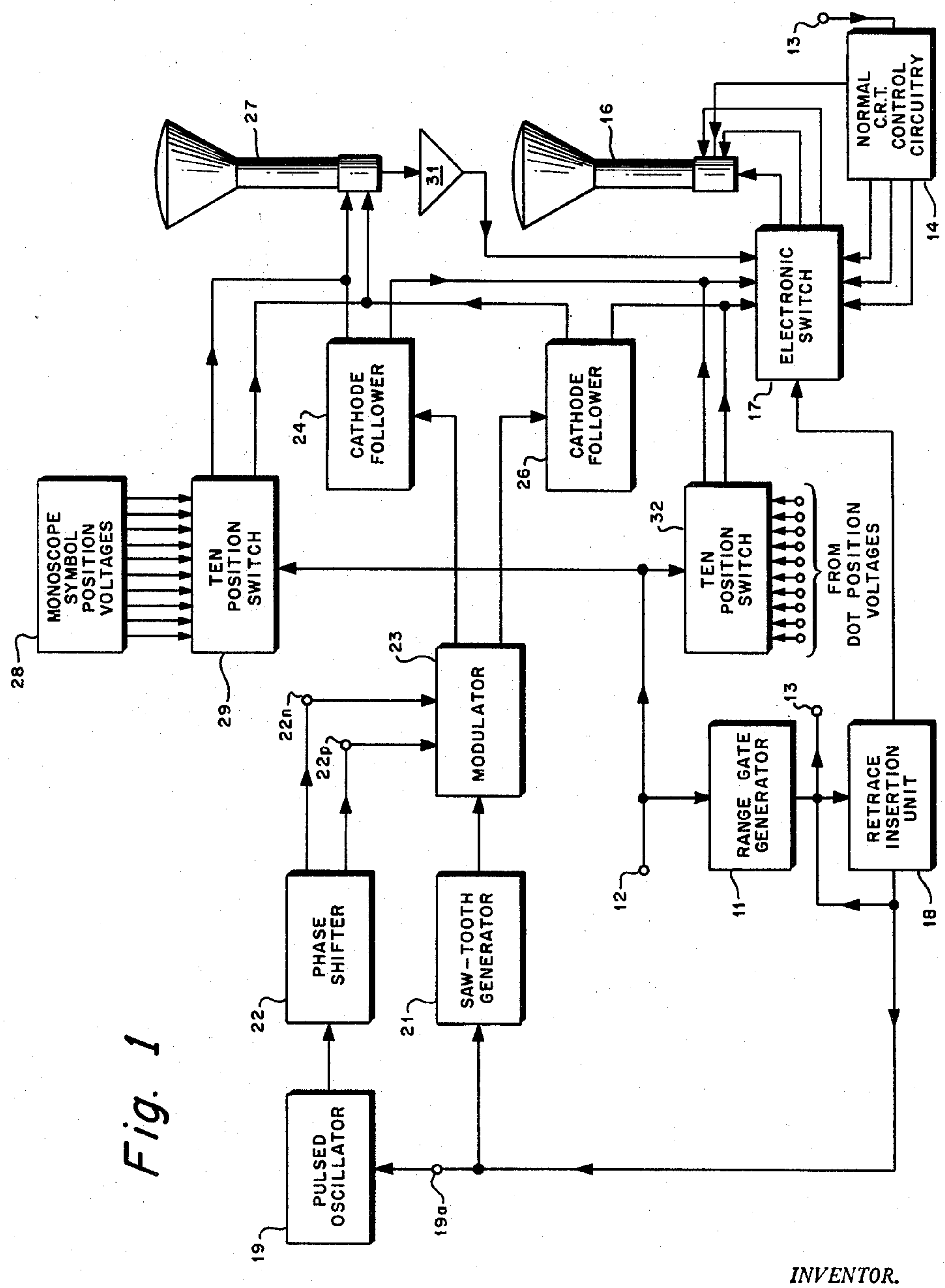

The invention described herein may be manufactured and used by or for the Government of the United States of America for governmental purposes without the payment of any royalties thereon or therefor.

The present invention relates to a system operative to generate symbol forming signals for application to a cathode ray tube display indicator during retrace.

Anti-submarine warfare and other tactical data presentation systems frequently employ cathode ray tube plan position indicators to display the parameters of a tactical situation. Parametric data is derived in an anti-submarine warfare system by operation of a variety of sensors such as radar, sonar, magnetic anomaly detectors, and distance measuring equipment. Retrace insertion units have been developed for use with the indicators whereby positionable dot or circle markers may be displayed upon the cathode ray tube screen during the sweep retrace interval to designate the various parameters. The markers together with time share generated cursors permit use of the cathode ray tube indicator as an electronic plotter. Retrace insertion systems and marker generators are disclosed in co-pending application Serial No. 18,774, of William S. Lyons, Jr., for Retrace Insertion System, filed March 30, 1960, and in co-pending application, Serial No. 52,748, of Frank B. Uphoff, for Symbol Waveform Generator, filed August 29, 1960.

While systems of the type described greatly extend the utility of cathode ray tube indicators employed for the display of tactical data, dot and circle markers are not sufficiently descriptive to readily permit identification of the parameters marked by them. The present invention overcomes this disadvantage by providing means to generate and to display during retrace highly graphic symbols adjacent retrace inserted dots instead of the dot and circle markers now used.

According to the invention, a selected symbol stored in a monoscope tube is scanned by a raster generated entirely within the retrace interval. Video signals thereby obtained from the monoscope tube are applied to a cathode ray tube indicator while at the same time the electron beam of the cathode ray tube is scanned in synchronism with the beam scan of the monoscope tube whereby the selected symbol is displayed upon the screen of the cathode ray tube indicator during retrace. The symbols stored in the monoscope, which may be of the alpha-numeric type, may be selected in any desired sequence. Appropriate circuitry is provided whereby the selected symbol may be associated with a selected retrace inserted dot to thereby identify the parameter designated by the dot.

It is therefore a principal object of the invention to improve the graphic nature of electronic plotters used in tactical data presentation systems.

It is another object of the present invention to extend the effectiveness of cathode ray tube indicators employed as electronic plotters in tactical data presentation systems by providing means to generate and display descriptive symbols associated with retrace inserted dots representing parameters of a tactical situation.

Figures 2, 3:
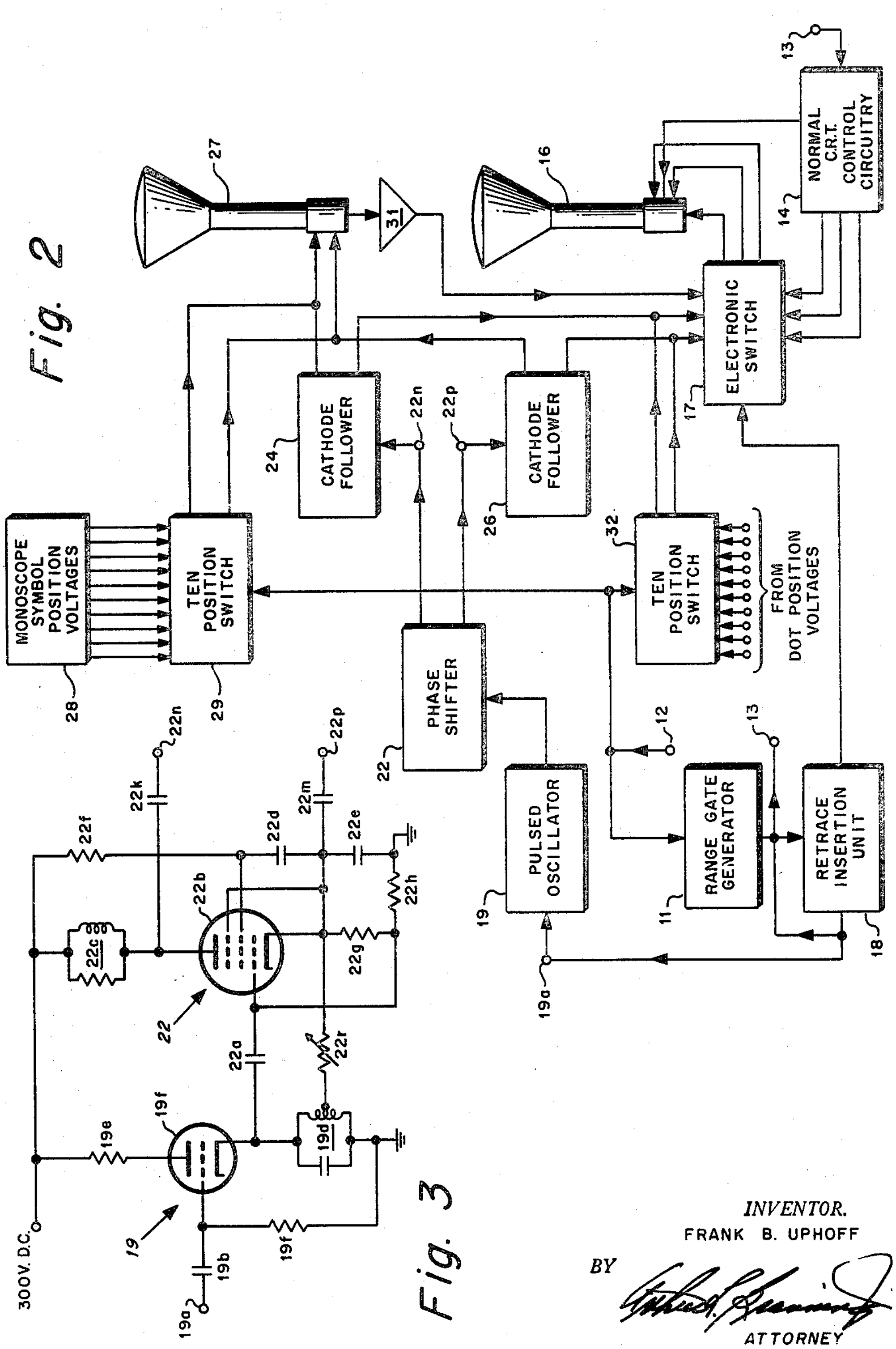
Figure 4:
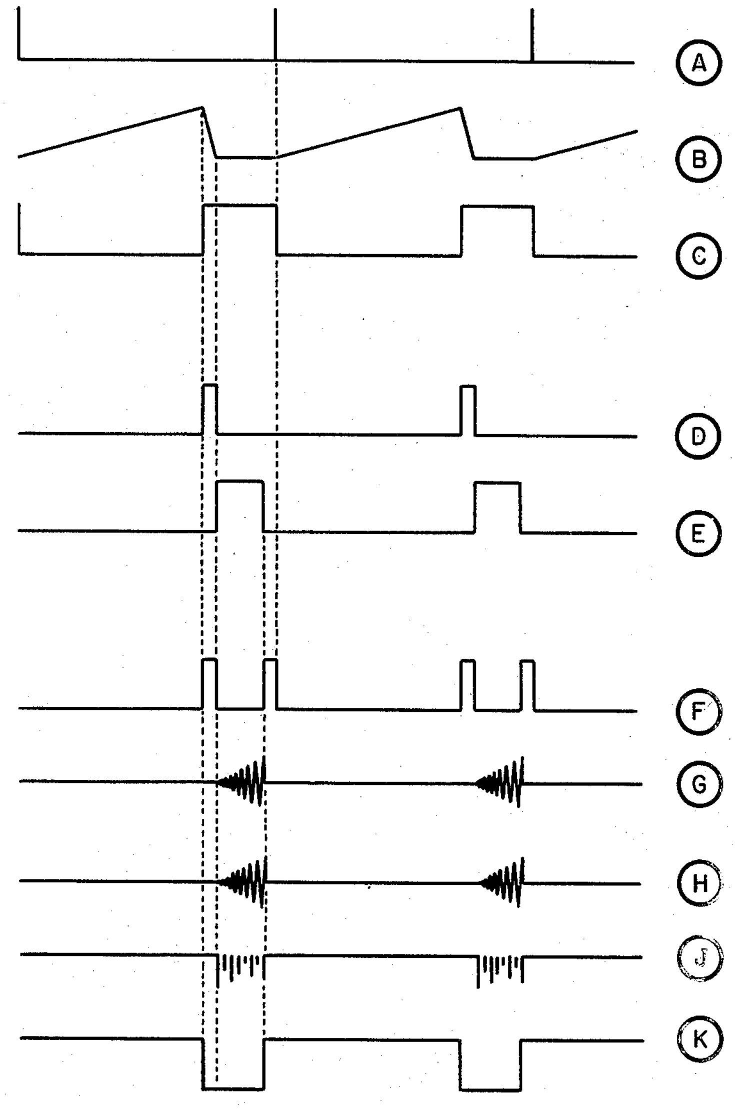

Other objects and many of the attendant advantages of this invention will be readily appreciated as the same becomes better understood by reference to the following detailed description when considered in connection with the accompanying drawings wherein:

FIG. 1 illustrates an embodiment of the invention in block diagram form;

FIG. 2, likewise in block diagram form, illustrates another embodiment of the invention;

FIG. 3 shows in circuit diagram form a pulsed oscillator and phase shifter which may be employed in the embodiments of FIGS. 1 and 2; and FIG. 4 illustrates the waveforms of significant signals appearing in the embodiments of the invention shown in FIGS. 1 through 3.

In order to facilitate an understanding of the present invention, before proceeding with a detail description of embodiments thereof, a brief summary of retrace insertion technique will be given by partial reference to FIGS. 1 and 4.

Referring now to FIG. 1, there is shown a range gate generator 11 of the type normally provided in radar indicating systems. Radar system triggers coupled to the range gate generator from a terminal 12 initiate the generation of a negative range gate having a duration selected to accord with the desired range scale of the indicator. The negative range gate is applied to a terminal 13 and coupled to initiate operation of the normal cathode ray tube control circuitry, designated in FIG. 1 by block 14. An unblanking signal is then coupled to a beam intensification element of a cathode ray tube tube 16 while video and beam deflection signals are coupled through an electronic switch 17 and applied to other appropriate elements of the cathode ray tube to permit display of target and other data on the screen thereof during the persistence of the range gate.

The remainder of the radar system is not shown since it is assumed to be conventional and since it per se forms no part of the present invention.

The radar system triggers, normal cathode ray tube beam deflection voltages, and range gate are respectively shown by waveforms A, B, and C in FIG. 4.

At the conclusion of the normal sweep interval, the positive going portion of the range gate is coupled to a retrace insertion unit 18 which then functions to generate a delay pulse of sufficient duration to permit recovery of the cathode ray tube yoke from the modulation signals applied thereto during the normal sweep interval. At the conclusion of the delay pulse, retrace insertion unit 18 functions to provide a brightening pulse, coupled to terminal 13, which is applied along with the range gate to cathode ray tube control circuitry 14. The brightening pulse and the range gate are combined within control circuitry 14 to form a composite unblanking signal which, as previously mentioned, is coupled to cathode ray tube 16.

In addition to the brightening pulse, retrace insertion unit 18 provides a switch gate which is coupled to control the operation of electronic switch 17. The switch gate is initiated upon termination of the normal sweep interval and terminates shortly before the termination of the retrace interval. For the duration of the switch gate, electronic switch 17 functions to decouple the normal cathode ray tube control circuitry from cathode ray tube 16 and to couple embodiments of the invention thereto.

The delay pulse, brightening pulse, composite unblanking signal, and switch gate are respectively shown by waveforms D, E, F, and K in FIG. 4.

At this juncture, it may be noted that the above-referenced co-pending applications disclose circuits which may be coupled through electronic switch 17 to cathode ray tube 16 and which are operable to generate and to display positionable dot or circle markers. Reference may be made to the applications to supplement the above-given brief description of retrace insertion if desired.

Referring again to FIGS. 1 and 4, according to the invention there may be provided a pulsed sine wave oscillator 19 and a sawtooth generator 21 having the control circuits thereof coupled in common to retrace insertion unit 18 whereby sine wave and sawtooth signals are initiated concurrently with the brightening pulse. The sine wave signals are coupled to a phase shifter 22 which provides a pair of ninety degrees phase displaced sine wave signals which are applied together with the sawtooth to a modulator 23.

Modulator 23 may be of the type disclosed in Patent No. 2,915,629, issued December 1, 1959 to A. A. Wolf, for Electronic Expander Circuit. The modulator functions to provide a pair of ninety degrees phase displaced sine wave signals which in the embodiment of FIG. 1 increase linearly in amplitude.

The output signals from modulator 23 are coupled through cathode followers 24, 26 and applied to a symbol monoscope 27 and through electronic switch 17 to cathode ray tube 16 as electron beam deflection voltages. As will be understood by those skilled in the art, deflection voltages of the character described will cause a spiral sweep or expanding circle raster to be generated in cathode ray tube 16 and monoscope 27.

The deflection voltages are shown by waveforms G and H in FIG. 4. It is to be understood that sweep voltages other than sine waves of linearly increasing amplitude may be employed if desired.

As mentioned above, symbol monoscope 27 has stored therein a plurality of graphic symbols. For example, the symbols may be stored electronically upon the screen of the monoscope and physically displaced thereon from each other. Selection of a desired symbol may be accomplished by applying appropriate beam positioning potentials to the deflection elements of the monoscope whereby the center of the scanned area of the monoscope screen approximately corresponds to the center of the character or symbol. In a contemplated form of the invention the beam positioning voltages are obtained from a monoscope symbol position voltage storage means 28 which may take any convenient form. Beam position voltage selection is accomplished by actuation of an electronic switch 29 which may be controlled by application thereto from terminal 12 of successive radar system triggers to thereby select beam positioning voltages in a predetermined sequence.

It is to be understood that switch 29 may comprise a manually operated or motor driven mechanical switch should it be desired or, for further example, a magnetron beam switching tube may be employed.

Video signals obtained during scanning of the selected symbol are coupled through a video amplifier 31 and through electronic switch 17 to be coupled to an appropriate element of cathode ray tube 16 to permit display of the selected symbol on the screen of the cathode ray tube. The monoscope video signals are shown by waveform J in FIG. 4.

It is contemplated that the selected symbol will be displayed adjacent to or juxtaposed upon the retrace inserted dot to be identified. For this purpose a second beam position voltage selection switch 32 is provided, controlled by radar system triggers coupled to the switch from terminal 12. The dot position voltages may be manually selected, derived from a programmed source, or may comprise analog voltages derived from the various sensors in the anti-submarine warfare system. This feature is more fully discussed in the above-referenced copending applications.

Comparison of the waveforms shown in FIG. 4 shows that all of the necessary modulating and video waveforms are generated and made available for the specified purposes entirely within the usable portion of the retrace interval.

It will be appreciated that the manner in which sweep signals are applied to cathode ray tube 16 and monoscope 27 insures that the electron beams thereof are deflected synchronously to thereby insure that the selected symbol is faithfully reproduced. However, it should be noted that positioning of the display dots and rasters in cathode ray tube 16 is independent of the positioning of the symbol monoscope rasters. This independence is required in order to permit positioning of the retrace inserted dots and associated symbols in correspondence with the tactical situation and, at the same time, to permit arbitrary assignment of symbols to each retrace inserted dot.

As mentioned above, the symbols employed in the present invention may be of the alpha-numeric type, however any symbol may be employed provided it is sufficiently graphic to clearly identify the parameters associated with the retrace inserted dots.

As shown in FIGS. 2 and 3, some simplification may be accomplished in the portion of applicant's system used to generate the retrace rasters. The portions of the embodiment of FIG. 2 that correspond to those of FIG. 1 have been assigned the same reference numerals.

In the embodiment of FIG. 2, sawtooth generator 21 and modulator 23 have been omitted. The manner in which this may be accomplished may be best understood by reference to FIG. 3 which shows oscillator 19 and phase shifter 22 in circuit diagram form.

Referring now to FIG. 3, the brightening pulse from retrace insertion unit 18, applied to terminal 19*a*, is coupled through capacitor 19*b* and applied to the grid of a triode 19*c* which, together with tank circuit 19*d*, anode resistor 19*e*, and grid resistor 19*f*, comprises a pulsed sine wave oscillator of the shock excited type. The sine wave signals from oscillator 19 are coupled through a capacitor 22*a* to pentode 22*b* of phase shifter 22.

The desired phase shift is accomplished by the combined action of the one hundred eighty degrees phase shift which occurs in pentode 22*b* and the reactive effects of anode tank circuit 22*c* and capacitors 22*d*, 22*e*. Resistors 22*f*, 22*g*, 22*h*, and capacitors 22*k*, 22*m* provide conventional biasing and coupling functions. Phase shifter 22 functions to provide a pair of ninety degrees phase displaced sine wave signals at terminals 22*n* and 22*p*. Decay of the sine wave output signals is provided by adjustment of a variable resistor 22*r* coupled between the cathode of pentode 22*b* and tank circuit 19*d* to provide a variable degree of positive feedback.

The deflection voltage generator shown in FIG. 3 and described above functions to provide sine wave deflection voltages the amplitudes of which diminish in an approximately linear manner. When the voltages are applied to the deflection elements of cathode ray tube 16 and monoscope 27 contracting circle rasters will be generated therein.

There have been described above highly graphic, relatively simple, and very flexible symbol signal generating and symbol display systems which are particularly useful when employed with cathode ray tube electronic plotters in tactical data presentation systems to clearly identify the parameters of a tactical situation associated with retrace inserted dots.

While specific embodiments have been disclosed, obviously many modifications and variations of the present invention are possible in the light of the above teachings. It is therefore to be understood that within the scope of the appended claims, the invention may be practiced otherwise than as specifically described.

What is claimed is:

1. A symbol display system in a plan position indicator with a normal raster comprising: a cathode ray tube provided with electron beam control circuitry adapted to be coupled to a source of recurring trigger pulses whereby a sweep is initiated in said cathode ray tube coincidently with the occurrence of each trigger pulse; means coupled to said electron beam control circuitry and to said cathode ray tube operative to unblank the electron beam of said cathode ray tube for a portion of each retrace interval; symbol generating means including electron beam sweep voltage generating means coupled to said electron beam control circuitry to be energized during said retrace interval; said symbol generating means further comprising, a storage tube having a plurality of graphic symbols stored therein and wherein video signals corresponding to a symbol are obtained by operation of an electron scanning beam, circuit means coupling said electron beam sweep voltage generating means conjointly to said storage tube and to said cathode ray tube whereby rasters are synchronously generated therein, means coupled to said storage tube operative to select a stored symbol, circuit means coupling video signals corresponding to the selected symbol to said cathode ray tube, and means operative to apply selected beam positioning voltages to said cathode ray tube along with electron beam sweep voltages and video signals whereby a selected symbol is displayed and positioned on the screen of said cathode ray tube during said portion of said retrace interval.

2. A symbol display system in a plan position indicator with a normal raster comprising: a cathode ray tube provided with electron beam control circuitry adapted to be coupled to a source of recurring trigger pulses whereby a sweep is initiated in said cathode ray tube coincidently with the occurrence of each trigger pulse; means coupled to said electron beam control circuitry and to said cathode ray tube operative to unblank the electron beam of said cathode ray tube for a portion of each retrace interval; symbol generating means including electron beam sweep voltage generating means coupled to said electron beam control circuitry to be energized during said retrace interval; said symbol generating means further comprising, a storage tube having a plurality of graphic symbols stored and physically displaced from each other upon the screen thereof and wherein video signals corresponding to a symbol are obtained by operation of an electron scanning beam, a source of symbol selection voltages, switching means coupled to be actuated by said trigger pulses and operative to sequentially apply symbol selection voltages as electron beam positioning voltages to said storage tube during successive cathode ray tube retrace intervals whereby the symbols stored in said storage tube are selected in a predetermined sequence, circuit means coupling video signals corresponding to a selected symbol to said cathode ray tube, means coupled to be controlled by said trigger pulses operative to sequentially apply selected beam positioning voltages to said cathode ray tube along with electron beam sweep voltages and video signals whereby a selected symbol is displayed and positioned on the screen of said cathode ray tube during said portion of said retrace interval.

3. The combination of claim 2 wherein said electron beam sweep voltage generating means comprises a pulsed sine wave oscillator and a sawtooth generator coupled conjointly to said cathode ray tube electron beam control circuitry to be energized during successive retrace intervals, phase shifting and signal modulating means coupled to said pulsed oscillator and to said sawtooth generator to be operative to provide a pair of ninety degrees phase displaced sine wave signals the amplitudes of which increase linearly.

4. The combination of claim 2 wherein said electron beam sweep voltage generating means comprises a pulsed sine wave oscillator coupled to said cathode ray tube electron beam control circuitry to be energized during successive retrace intervals, phase shifting means coupled to said pulsed sine wave oscillator, and circuit means coupled between said phase shifting means and said pulsed sine wave oscillator operative to provide a selected amount of positive feedback whereby a pair of ninety degrees phase displaced sine wave signals are provided which decay in amplitude.

5. A symbol generating system in a plan position indicator with a normal raster provided with an electron beam sweep voltage generating means for used with a cathode ray tube display system which includes a cathode ray tube provided with electron beam control circuitry, a gate generator adapted to be coupled to a source of recurring trigger pulses whereby a sweep gate of selectable duration is generated initiating coincidently with the occurrence of each trigger pulse, circuit means coupling said sweep gate to said electron beam control circuitry whereby a sweep is initiated in said cathode ray tube which persists for the duration of said gate, a retrace insertion unit coupled to be energized upon termination of said sweep gate, said retrace insertion unit being operative after a time delay to generate a brightening pulse which persists until shortly before the occurrence of the next sweep gate, circuit means coupling said brightening pulse to said cathode ray tube to unblank the electron beam thereof for the duration of said brightening pulse, and circuit means coupling said brightening pulse to said electron beam sweep voltage generating means to cause operation thereof during the duration of said brightening pulse; said symbol generating system further comprising a storage tube having a plurality of graphic symbols stored therein and wherein video signals corresponding to a symbol are obtained by operation of an electron scanning beam, circuit means coupling said electron beam sweep voltage generating means conjointly to said storage tube and to said cathode ray tube whereby rasters are synchronously generated therein, means coupled to said storage tube operative to select a stored symbol, circuit means coupling video signals corresponding to the selected symbol to said cathode ray tube, and means operative to apply selected beam positioning voltages to said cathode ray tube along with electron beam sweep voltages and video signals whereby a selected symbol is displayed and positioned on the screen of said cathode ray tube during said portion of said retrace interval.

6. A symbol generating system in a plan position indicator with a normal raster provided with an electron beam sweep voltage generating means for use with a cathode ray tube display system which includes a cathode ray tube provided with electron beam control circuitry, a gate generator adapted to be coupled to a source of recurring trigger pulses whereby a sweep gate of selectable duration is generated initiating coincidently with the occurrence of each trigger pulse, circuit means coupling said sweep gate to said electron beam control circuitry whereby a sweep is initiated in said cathode ray tube which persists for the duration of said gate, a retrace insertion unit coupled to be energized upon termination of said sweep gate, said retrace insertion unit being operative after a time delay to generate a brightening pulse which persists until shortly before the occurrence of the next sweep gate, circuit means coupling said brightening pulse to said cathode ray tube to unblank the electron beam thereof for the duration of said brightening pulse, and circuit means coupling said brightening pulse to said electron beam sweep voltage generating means to cause operation thereof during the duration of said brightening pulse; said symbol generating system further comprising a storage tube having a plurality of graphic symbols stored and physically displaced from each other upon the screen thereof and wherein video signals corresponding to a symbol are obtained by operation of an electron scanning beam, a source of symbol selection voltages, switching means coupled to be actuated by said trigger pulses and operative to sequentially apply symbol selection voltages as electron beam positioning voltages to said storage tube during successive cathode ray tube retrace intervals whereby the symbols stored in said storage tube are selected in a predetermined sequence, circuit means coupling video signals corresponding to a selected symbol to said cathode ray tube, means coupled to be controlled by said trigger pulses operative to sequentially apply selected beam positioning voltages to said cathode ray tube along with electron beam sweep voltages and video signals whereby a selected symbol is displayed and positioned on the screen of said cathode ray tube during said portion of said retrace interval.

7. The combination of claim 6 wherein said electron beam sweep generating means comprises a pulsed sine wave oscillator and a sawtooth generator coupled conjointly to said cathode ray tube electron beam control circuitry to be energized during successive retrace intervals, phase shifting and signal modulating means coupled to said pulsed oscillator and to said sawtooth generator operative to provide a pair of ninety degrees phase displaced sine wave signals the amplitudes of which increase linearly.

8. The combination of claim 6 wherein said electron beam sweep voltage generating means comprises a pulsed sine wave oscillator coupled to said cathode ray tube electron beam control circuitry to be energized during successive retrace intervals, phase shifting means coupled to said pulsed sine wave oscillator, and circuit means coupled between said phase shifting means and said pulsed sine wave oscillator operative to provide a selected amount of positive feedback whereby a pair of ninety degrees phase displaced sine wave signals are provided which decay in amplitude.

References Cited by the Examiner

UNITED STATES PATENTS

| | | | |
|---|---|---|---|
| 2,549,780 | 4/51 | Earp | 315—22 |
| 2,784,251 | 3/57 | Young et al. | 340—324.1 |
| 2,849,707 | 8/58 | White | 343—5 |
| 2,931,936 | 4/60 | Burgett | 315—8.6 |
| 2,935,744 | 5/60 | Foy | 315—9 |
| 2,976,529 | 3/61 | McNaney | 340—324.1 |
| 3,020,441 | 2/62 | Hamann | 340—324.1 |
| 3,123,824 | 3/64 | Sherertz | 343—5 |

NEIL C. READ, *Primary Examiner.*

RALPH G. NILSON, *Examiner.*